United States Patent
Peitzmeier et al.

(10) Patent No.: US 7,036,784 B2
(45) Date of Patent: May 2, 2006

(54) APPARATUS FOR HOLDING DRINK CONTAINERS

(75) Inventors: Ralf Peitzmeier, Sindelfingen (DE); Albert Reinhardt, Herrenberg (DE); Juergen Schrader, Weil im Schoenbuch (DE)

(73) Assignee: DaimlerChrysler AG, Stuttgart (DE)

( * ) Notice: Subject to any disclaimer, the term of this patent is extended or adjusted under 35 U.S.C. 154(b) by 340 days.

(21) Appl. No.: 10/205,498

(22) Filed: Jul. 26, 2002

(65) Prior Publication Data

US 2003/0029878 A1 Feb. 13, 2003

(30) Foreign Application Priority Data

Jul. 26, 2001 (DE) .................. 101 36 115
May 25, 2002 (DE) .................. 102 23 404

(51) Int. Cl.
*A47K 1/08* (2006.01)
(52) U.S. Cl. ................... 248/311.2; 224/926
(58) Field of Classification Search ........... 248/311.2, 248/314, 315, 289.11, 309.2; 224/926; 403/165
See application file for complete search history.

(56) References Cited

U.S. PATENT DOCUMENTS

| | | | |
|---|---|---|---|
| 1,179,286 A * | 4/1916 | Crimmel | 248/289.11 |
| 2,708,062 A * | 5/1955 | Poyer | 224/275 |
| 2,766,473 A * | 10/1956 | Thackara | 15/230.11 |
| 2,895,700 A * | 7/1959 | Johnson | 248/210 |
| 2,926,879 A | 3/1960 | Dietrich | 248/311.2 |
| 3,050,223 A | 8/1962 | Scioloro | 224/275 |
| 3,168,341 A * | 2/1965 | Beaudet | 403/327 |
| 3,842,981 A | 10/1974 | Lambert | 211/74 |
| 3,929,228 A * | 12/1975 | Margolin et al. | 211/102 |
| 5,022,626 A | 6/1991 | Nozel et al. | 248/311.2 |
| 5,056,746 A * | 10/1991 | Parsons et al. | 248/188 |
| 5,174,534 A | 12/1992 | Mitchell | |
| 5,370,348 A * | 12/1994 | Toth | 248/289.11 |
| 5,687,874 A * | 11/1997 | Omori et al. | 220/737 |
| 5,785,290 A * | 7/1998 | Harris | 248/311.2 |
| 5,813,646 A * | 9/1998 | Bartholomae | 248/311.2 |
| 6,039,206 A * | 3/2000 | DeFrancesco | 220/737 |
| 6,099,062 A * | 8/2000 | Siegel | 296/37.12 |
| 6,116,807 A * | 9/2000 | Dzurko et al. | 403/165 |
| 6,170,787 B1 | 1/2001 | Morgan | 248/311.2 |
| 6,478,371 B1* | 11/2002 | Clarke | 297/188.11 |
| 6,641,102 B1* | 11/2003 | Veltri et al. | 248/311.2 |
| 6,779,767 B1* | 8/2004 | Kuhn | 248/276.1 |
| 2002/0063192 A1* | 5/2002 | Porcelli | 248/311.2 |
| 2004/0222345 A1* | 11/2004 | Lindsay | 248/311.2 |

FOREIGN PATENT DOCUMENTS

| | | |
|---|---|---|
| DE | 7530236 | 4/1976 |
| DE | 7726634 | 1/1978 |
| DE | 40 22 193 A1 | 7/1990 |
| DE | G 94 08 692.3 | 5/1994 |
| DE | 199 59 895 A1 | 12/1999 |
| DE | 20016019 | 1/2001 |
| DE | 19955436 | 5/2001 |
| DE | 20103870 | 8/2001 |
| JP | 10264709 | 10/1998 |

* cited by examiner

*Primary Examiner*—Ramon O Ramirez
(74) *Attorney, Agent, or Firm*—Crowell & Moring LLP (57) ABSTRACT

A device for holding a drink container, such as a cup, mug or bottle, of different diameters in the interior of a passenger car includes a coupling device, into which a bottle holder or cup holder can be inserted and removed therefrom, on the center console or on a seat. Other containers, such as a refuse container or tray can also be inserted into the coupling device.

12 Claims, 6 Drawing Sheets

APPARATUS FOR HOLDING DRINK CONTAINERS

BACKGROUND AND SUMMARY OF THE INVENTION

This application claims the priority of German patent document 101 36 115.7, filed Jul. 26, 2001 and German patent document 102 23 404.3, filed May 25, 2002, the disclosures of which are expressly incorporated by reference herein.

The invention relates to an apparatus for holding drinks containers in a passenger vehicle.

German utility model G 94 08 692.3 discloses a device for holding drink containers in a motor vehicle, which has an expandable spring ring, into which a drink container can be clamped. Fixed to the spring ring is a clippable holder for clipping onto the seat adjustment operating handle, for example. This device only has a low retaining force; moreover, it can be used only for drink containers of a size that matches that of the spring ring. In addition, this device adversely affects the ability of the seat occupant to adjust the seat, and constitutes a serious hazard, in the event of a crash, since the device can then become detached and fly around uncontrollably inside the vehicle.

German patent document DE 199 59 895 A1 shows a motor vehicle seat having a drawer that includes a cup holder, which is accessible after pulling the drawer open. A disadvantage of this arrangement is that it greatly restricts the foot well space when the cup holder is in use.

German patent document DE 40 22 193 A1 describes a device for holding a drink container that is arranged in the center console of a vehicle, and has an annular holder that is pivotally supported by way of a swivel device on the center console. When not in use, the device is swiveled into a stowage compartment arranged in the center console; for use, it is swiveled out of the stowage compartment. A disadvantage of this device is that it will only hold drink containers of a shape that matches that of the holder; moreover, the device itself takes up a relatively large amount of space in the center console when not in use, and is of relatively expensive design.

One object of the invention is to create a device for holding drink containers in the interior of a passenger car, which is of simple design and compact construction.

Another object of the invention is to provide a device that will reliably hold various types of drink containers. Finally, still another object of the invention is to provide a drink holder that poses the least possible hazard, particularly in the event of an accident.

These and other objects and advantages are achieved by the drink holder apparatus according to the invention, which includes a coupling device, into which a so-called bottle or cup holder can be optionally inserted and also taken out again. In order not to impinge to any great extent on the space available, the coupling device may be arranged at the rear end of the center console, so that it projects beyond the center console into the rear compartment.

In order to ensure that the bottle holder or cup holder is readily accessible while underway, it is also proposed to arrange the coupling device on the frame of a seat, so that it projects forward of the seat cushion and points into the foot well forward of the seat. The coupling device holds the bottle holder or cup holder in the foot well, preferably in the right or left-hand area of the seat. It may be arranged on the driver's seat, and/or on the front passenger seat, and/or on the rear seat bench for the rear seat passengers.

When not in use, the bottle holder can simply be taken out of the coupling device and then does not take up any additional space.

In order to minimize the risk of injury in the event of a crash, the coupling device and/or the bottle holder is supported so that it can pivot about a vertical axis. Therefore, if a passenger comes into contact with the bottle holder, it moves out of the way. The pivotal support furthermore improves the accessibility of the cup holder, since it can be swiveled into a position where it is easy to reach.

In one embodiment, the coupling device has a socket, into which a spindle of the bottle holder or cup holder can be inserted from above. The socket may have a shape designed to complement the spindle, so that it exerts a frictional grip around the spindle, thereby holding it and the bottle holder securely in the socket even under high loads. The socket may have a manual or automatic catch device, which locates the spindle securely in the socket.

In order to hold even heavy drinks containers, such as bottles, securely, the bottle holder preferably has a cup-shaped drink container receptacle with a circular internal cross section and a base. For holding differently shaped drink containers securely, it is possible to introduce an insert, having a number of different inside diameters, into the drink container receptacle. The insert is preferably designed so that the smallest inside diameter is arranged toward its base, and the largest inside diameter is at the top.

In an advantageous embodiment the drink container receptacle has leaf springs for holding containers by frictional contact, three such leaf springs being arranged around the inside wall of the receptacle. The upper end of the leaf springs can be fixed so that it bears on the inside wall or is sunk in the inside wall. The lower end points towards the middle of the drink container receptacle, so that the leaf springs each have a sprung, inclined surface, which grips a drink container when it is inserted. The leaf springs are arranged so that they cause the drink container receptacle to narrow towards the bottom, so that differently shaped drink containers of various sizes (cups or mugs or bottles or drinks cans, for example), can be held in by frictional contact.

In another embodiment, instead of holding a bottle holder or cup holder, the coupling device can also be capable of holding another container or holder, such as a refuse container or a tray, for example, which each have a similarly shaped spindle to the cup holder.

The features and combinations of features referred to above and cited below may of course be used not only in the particular combination specified but also in other combinations or alone, without departing from the scope of the invention.

Other objects, advantages and novel features of the present invention will become apparent from the following detailed description of the invention when considered in conjunction with the accompanying drawings.

DETAILED DESCRIPTION OF THE INVENTION

Figure 1:
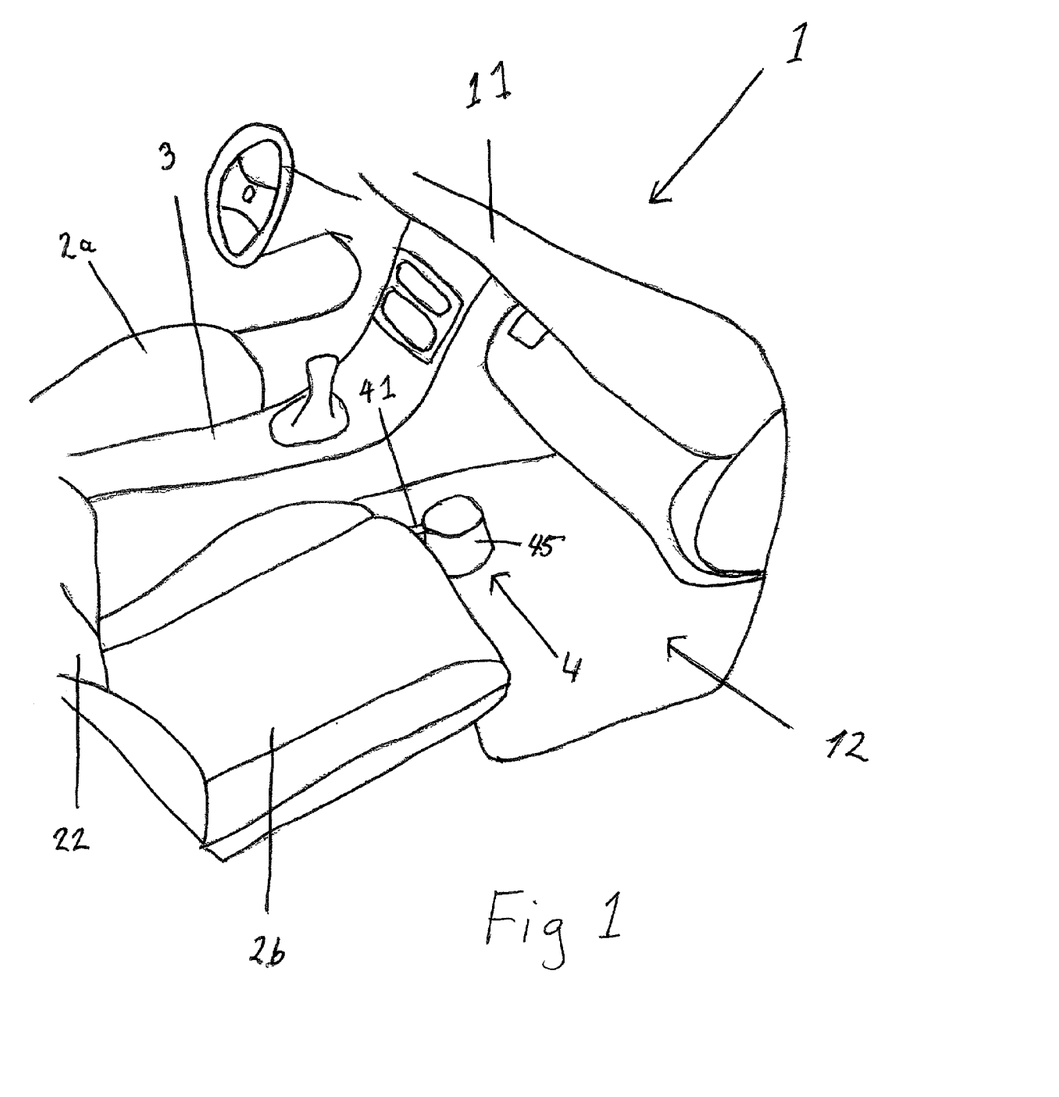
FIG. 1 shows a device according to the invention for holding drink containers in the front area of a passenger car interior.

FIG. 1 shows a perspective view of the front section of an interior of a passenger car with a device 1 for holding drinks containers. A dashboard 11 is arranged at the front of the interior below the windshield. In the middle of the interior, a center console 3 is arranged between a driver's seat 2a and a front passenger seat 2b. The center console 3 extends in the middle area of the vehicle interior below the dashboard, from the engine compartment rear bulkhead, closing off the vehicle interior towards the front, to a rear compartment 13 beginning behind the backrests 22 of the front seats 2a, 2b. The center console, which is a dished, standardized plastic part, contains operating control elements needed for operating the vehicle. These include, for example, a gearshift lever or controls for operating electric window lifters.

On either side of the center console 3 and in front of the seats 2a, 2b is a foot well 12, the driver's foot well being situated in front of the driver's seat 2a and the front passenger foot well in front of the front passenger seat 2b. The front passenger seat 2b has a coupling device 41, which holds a cup holder or bottle holder 4, which in the front passenger foot well is arranged in front of the seat cushion 21 of the front passenger seat 2b.

Figure 2:
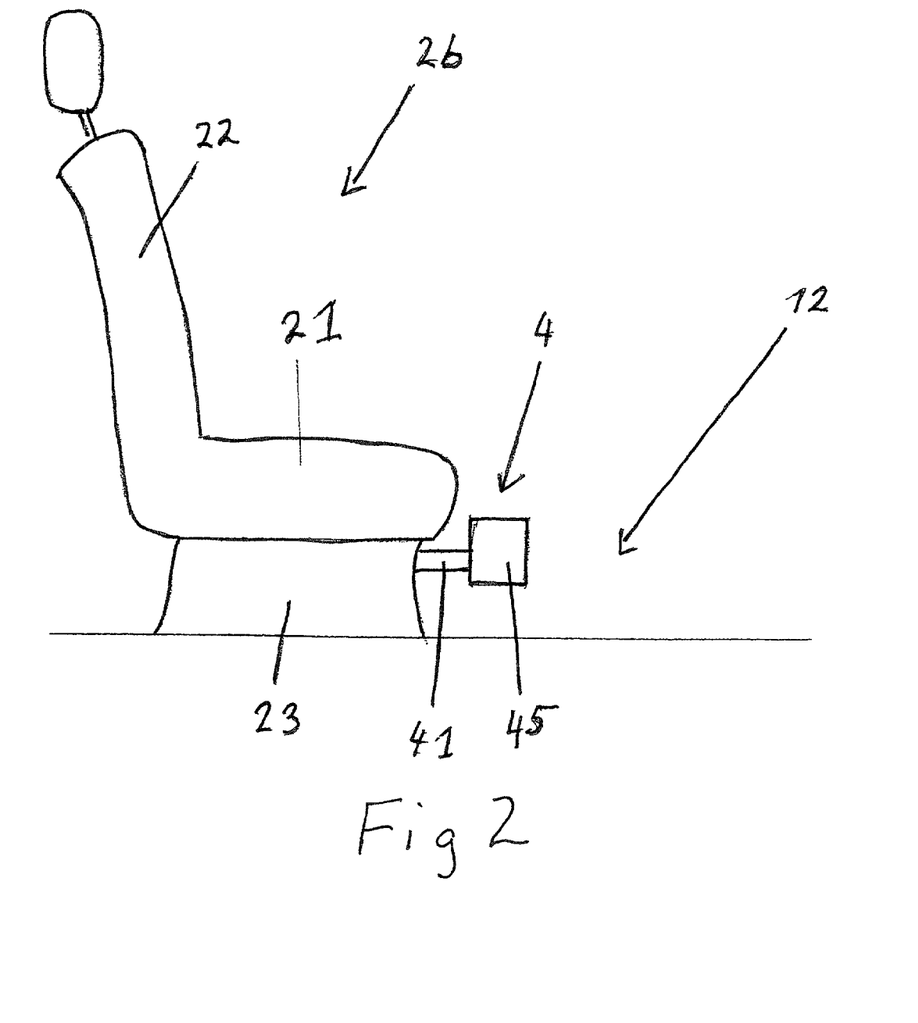
FIG. 2 shows a vehicle seat with coupling device and cup or bottle holder.

The structure of the front passenger seat 2b is represented in FIG. 2. The front passenger seat 2b is slide-mounted by way of rails on the floor of the vehicle interior. A frame 23 carries the seat cushion 21 and holds the seat on the rails. A backrest 22, which has a headrest, is arranged at the rear end of the front passenger seat 2b.

The coupling device 41 is fixed to the frame 23, either rigidly, or supported so that it is pivotable about an axis, in particular about a vertical axis perpendicular to the vehicle floor. The coupling device 41 is designed so that it projects beyond the dimensions of the seat cushion 21 into the foot well 12. At its end facing towards the foot well 12, the coupling device 41 has a socket 42 (FIG. 4), which holds a bottle holder 4 with drink container receptacle 45. The coupling device 41 is designed so that the bottle holder 4 or the drink container receptacle 45 is arranged above the interior floor and below the seat surface of the seat cushion 21.

Figure 3:
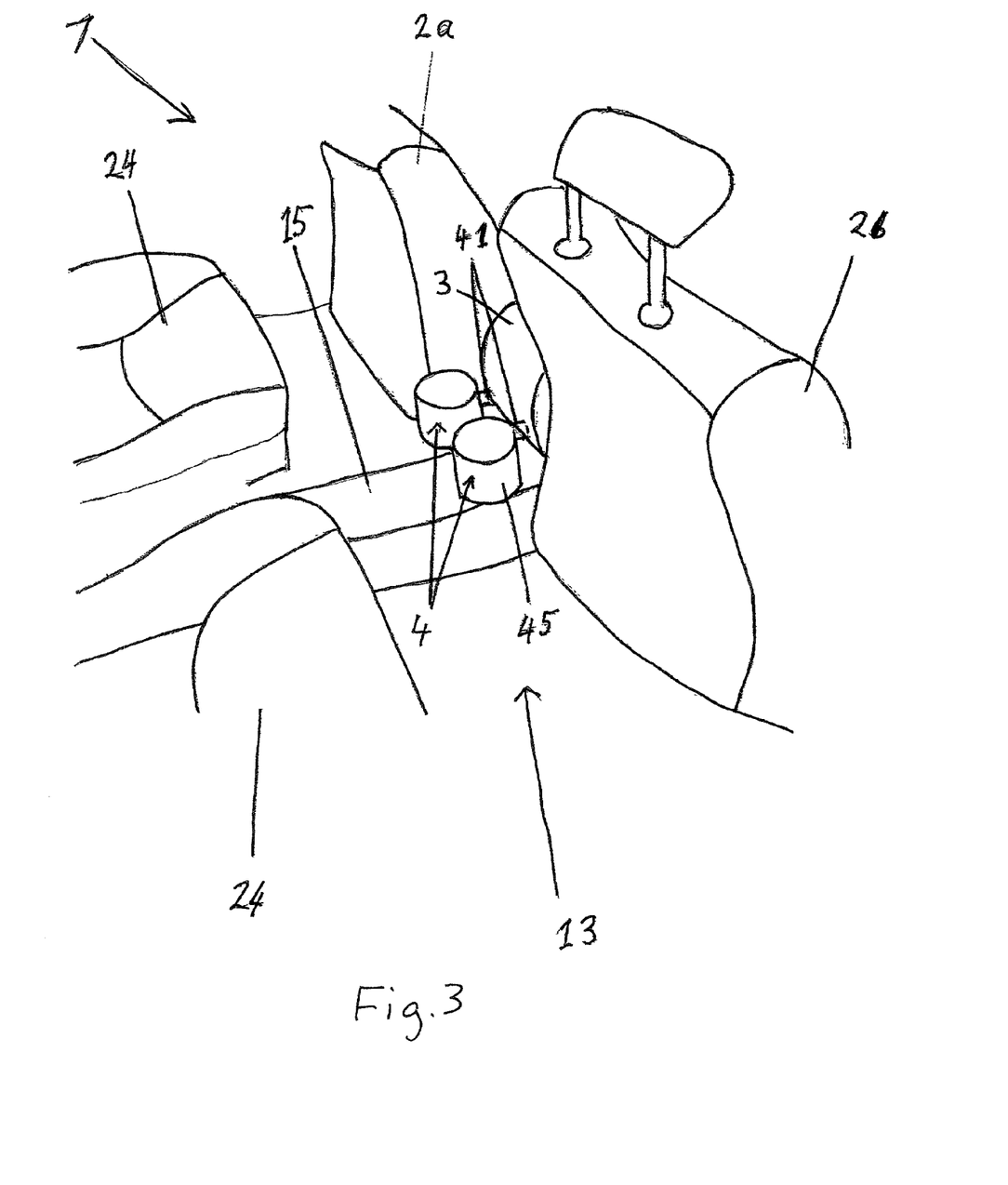
FIG. 3 shows a device for holding drink containers in the rear area of a passenger car interior.

The device 1 for holding drink containers in the rear area of the vehicle interior is represented in FIG. 3. The backrests of the driver's seat 2a and of the front passenger seat 2b divide the rear section from the front section represented in FIG. 1. A rear seat bench 24 defines the rear part of the vehicle interior. The rear compartment 13 is situated between the rear seat bench and the backrests of the front seats. A transmission tunnel 15 runs in the middle of the vehicle interior from front to rear and divides the foot well area of the rear compartment 13 into a left-hand and a right-hand section, and the center console 3 is arranged between the front seats 2a, 2b above the transmission tunnel. Depending on the position of the front seats, the rear end of the center console 3 ends approximately flush with the backrests of the front seats 2a, 2b and therefore directly adjoins the rear compartment 13.

At its rear end the center console 3 has two coupling devices 41, which each hold a cup holder or bottle holder 4. The coupling devices 41 are at one end articulated on the rear end of the center console 3 so that they can swivel about a vertical axis perpendicular to the interior floor. At their other end projecting into the rear compartment the coupling devices 41 have a socket 42 (FIG. 4) for fixing a cup holder or bottle holder 4 with drinks container receptacle 45. The coupling devices 41 are designed so that the cup holder or bottle holder 4, or the drink container receptacle 45 is arranged above the transmission tunnel. The cup holder or bottle holder 4 is therefore readily accessible without restricting the foot well space available in the rear compartment to the left and right of the transmission tunnel 15.

The pivotably supported coupling device 41 means that the cup holder or bottle holder 4 can swivel away laterally in the event of an accident, so that it does not constitute a rigid obstruction, thereby reducing any risk of injury.

Figure 4:
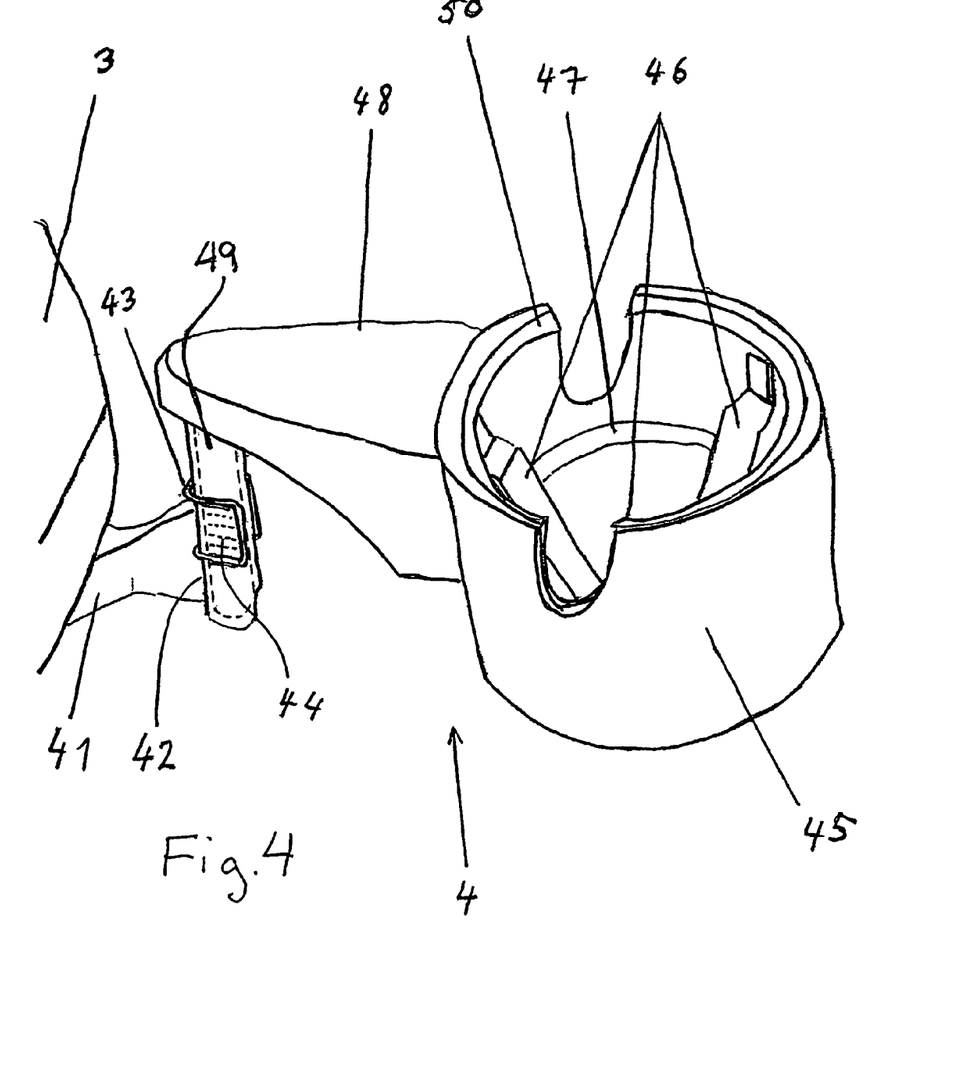
FIG. 4 shows a center console with a coupling device and bottle holder.

The structure of the bottle holder 4 and of the coupling device 41 is shown in FIG. 4. The coupling device 41 has a cuboidal body, one end of which is here, for example, supported on the center console 3, but it may also be supported on the frame 23 of a seat, as shown in FIG. 2. The other end of the cuboidal body is connected to the socket 42. A spindle 49 of the cup holder 4 is accommodated in the socket 42.

The socket 42 has a shape that conforms to the circular cross section of the spindle 49, so that the latter is held in the socket 42 by frictional contact, allowing it to rotate. The socket 42 comprises a catch device, with spring 43, for locating the spindle. The spring 43 has two retaining clips bent from spring wire, which grip the spindle 49 from two sides. The spindle 49 is inserted into the socket 42 from above. A plurality of transverse slots 44 (indicated schematically by dash lines in FIG. 4), in which the spring 43 engages, thereby locating the spindle 49 to prevent it being accidentally detached, are arranged in the spindle. A stop, which interacts with the spring 43, thereby defining the insertion depth of the spindle 49 and hence also the height of the cup holder 4, is arranged at the bottom end of the spindle.

At its upper end the spindle 49 is connected by way of a support arm 48 to the drink container receptacle 45 of the bottle holder 4. The drink container receptacle 45 has a cup shape, that is to say it is open at the top, has a circular internal cross section, a circular external cross section, and a base. Three leaf springs 46 are distributed around the circumference of the inside wall of the drink container receptacle 45. One end of each of the leaf springs 46 is fixed to the inside wall in the upper area of the drink container receptacle 45, while the other end points towards the center of the drinks container receptacle 45. Thus, the leaf springs 46 each form an inclined surface running from the upper wall of the drink container receptacle 45 downwards towards the center.

When a drink container is inserted into the receptacle 45 from above, the inclined surfaces of the leaf springs 46 bear against it, and their spring force holds it in the receptacle by frictional contact. The opposing surfaces of the leaf springs 46 running downwards at an angle, so that they hold drink containers of different diameters and/or different shapes, such as cups or mugs or bottles or drinks cans, securely and reliably.

The drink container receptacle 45 has two recesses in the side wall to accommodate the handles of cups or mugs placed in the drink container receptacle 45.

An insert 50, which reduces the inside diameter of the drink container receptacle 45, can be introduced into the drinks container receptacle 45, and located therein by means of a catch device. The catch device has slots arranged on the inside wall of the drink container receptacle 45, in which catch elements of the insert engage. In its wall, the insert 50 also has two opposing recesses for the handles of cups, which with the insert introduced into the drink container receptacle 45 align with recesses in the drink container receptacle 45.

The leaf springs 46 of the receptacle 45 hold the insert 50 therein by means of their inclined surfaces, which bear against the insert 50 and hold it by frictional contact.

The inside diameter of the insert 50 narrows at step 47 towards the bottom. The drink container receptacle 45 therefore has a larger and smaller inside diameter for drinks containers of different sizes.

Figure 5:
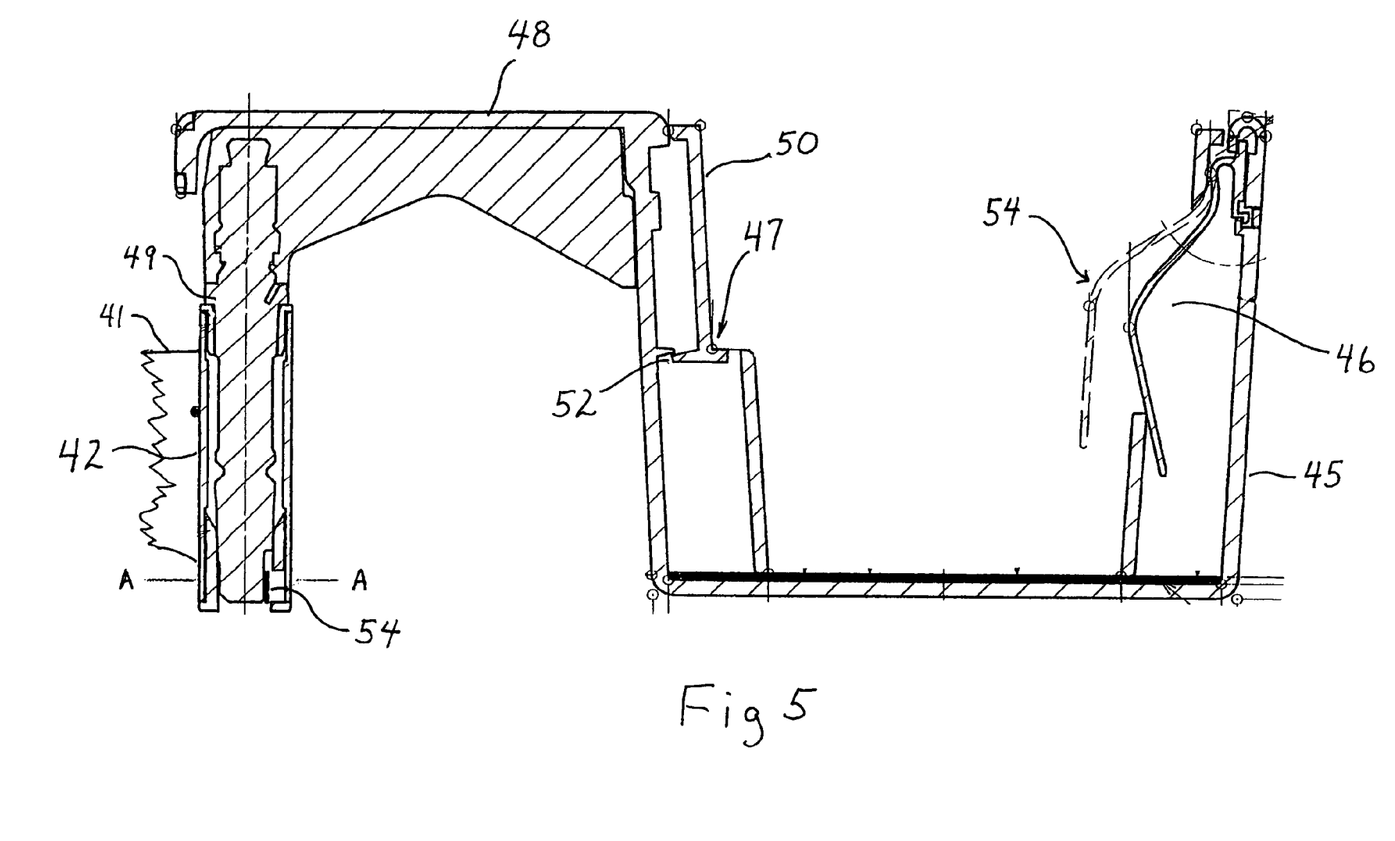
FIG. 5 is a cross sectional side view through the cup or bottle holder.

FIG. 5 shows a section through the cup or bottle holder 4. The drink container receptacle 45 is pivotally supported in a socket 42 of the coupling device 41 by way of a support arm 48 and a spindle 49, fixed to the support arm so that it cannot rotate. The coupling device 41 is in turn fixed to the center console or to a seat.

The insert 50 is inserted in the drink container receptacle 45, and is held there by a catch device 52 that has a lug formed on the inside wall of the drink container receptacle 45. A clip on the insert 50 grips behind the said lug.

The insert 50 reduces the inside diameter of the drink container receptacle 45, having two different diameters for holding drink containers of different shapes. Approximately half way up the insert a step 47 is formed projecting towards the middle of the bottle holder, so that the inside diameter of the insert 50 diminishes abruptly at the step 47.

In order to facilitate the insertion of drink containers into the bottle holder and/or their removal therefrom, the walls of the insert 50 are designed with a slight taper downwards towards the base.

In the side wall of the insert 50, at the position of each of the leaf springs 46, recesses 54 are arranged through which the leaf springs 46 extend for holding the drinks containers.

Figure 6:
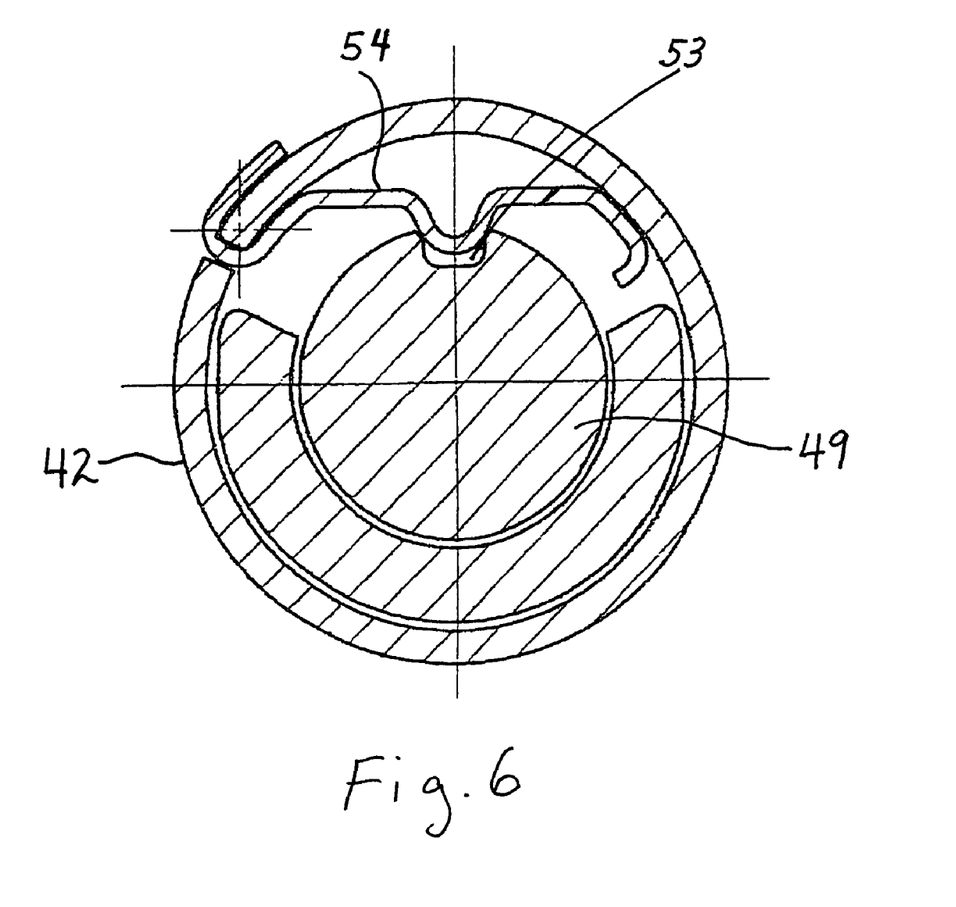
FIG. 6 shows a section along the line A—A in FIG. 5.

FIG. 6 shows a section along the line A—A in FIG. 5. The spindle 49 is supported in the socket 42 so that it can swivel about its vertical axis. In order to permit a preferred position of the cup holder 4, aligned in or counter to the direction of travel, for example, the spindle 49 is designed so that it can be located in such a position. At its bottom end the spindle 49 has a longitudinally extending slot 53, which interacts with a spring 54, which is fixed to the socket 42 and is formed so that it engages, locating in the slot 53, when the spindle is situated in the desired position. The locating mechanism can be cancelled by overcoming the spring force of the spring 54, and the cup holder 4 swiveled about the spindle 49. In so doing, the spring 54 remains in contact with the spindle 49 and fixes its position through frictional wedging between the spindle 49 and the spring 54. The spring 43 takes the form, in particular, of a leaf spring or a wire spring.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. In a passenger vehicle that has first and second front vehicle seats, each having a frame carrying a seat cushion, and a center console arranged between the front vehicle seats and extending from a dashboard to a rear passenger space of the car, apparatus comprising:

at least one coupling device comprising a horizontally disposed arm having proximal and distal ends, with the distal end being supported on at least one of i) an end of the center console toward the rear passenger space, with the distal end of the arm projecting horizontally beyond the center console into the rear passenger space, and ii) a front side of at least one of said frames with the distal end of the arm, projecting horizontally forward of the seat cushion of said at least one of said frames and extending into a foot well; and a drink receptacle; wherein the drink receptacle has a spindle; and the coupling device comprises a socket at its distal end for receiving the spindle, which is removably insertable into the socket from above.

2. The apparatus according to claim 1, wherein, the coupling device supports the drink receptacle, pivotably about a vertical axis perpendicular to an interior floor of the vehicle.

3. The apparatus according to claim 1, wherein the socket includes a spring with two legs that grip the spindle from two sides.

4. The apparatus according to claim 3, wherein:

the spring has a spring wire that grips substantially around the spindle; and the spindle has a plurality of slots running transversely to a longitudinal axis thereof, in which the spring wire engages in order to fix a location of the spindle.

5. The apparatus according to claim 1, wherein the spindle has a slot running partially along the spindle, in which a spring of the socket locates.

6. The apparatus according to claim 1, wherein the drink receptacle comprises a cup-shaped drink container receptacle with a circular inside diameter and base.

7. The apparatus according to claim 6, wherein the drink container receptacle has three tension springs for holding drink containers, the springs being situated about an inside wall of the drink container receptacle.

8. The apparatus according to claim 7, wherein the tension springs are leaf springs, an upper end of which is fixed to the inside wall of the drink container receptacle, resting thereon or sunk therein, and a free, lower end of which is angled toward a central axis of the drink container receptacle, such that the leaf springs each have an inclined surface, which causes the inside diameter of the drink container receptacle to narrow towards a base thereof.

9. The apparatus according to claim 8, further comprising:

an insert, which reduces an inside diameter of the drink container receptacle for holding small drink containers and is insertable into the drink container receptacle.

10. The apparatus according to claim 9, wherein the insert has an inside diameter that narrows towards the base of the drink container receptacle.

11. The apparatus according to claim 10, wherein the drink container receptacle has a catch device for holding the insert.

12. Apparatus for holding a drink container in a vehicle, comprising:

a supporting member comprising a horizontally extending first arm; and a drink receptacle; wherein at a proximal end thereof, the supporting member is fixedly mounted to a fixed component in an interior of the vehicle, with the first arm projecting horizontally into a footwell space in said interior of the vehicle;

at a distal end thereof, the supporting member has a coupling to which said drink receptacle is pivotably and removably mountable; wherein said fixed component is one of a vehicle seat and a center console of said vehicle;

said drink receptacle has a space for receiving a drink container, supported by a second arm that is pivotably mountable to the coupling of the supporting member, at an end of said second arm that is opposite said space for receiving a drink container;

said coupling comprises a socket for receiving a spindle of the drink receptacle, which is removably insertable into the socket from above;

whereby a position of said space for receiving a drink container can be adjusted relative to said arm.

* * * * *